US012744012B2

(12) United States Patent
Cashen et al.

(10) Patent No.: US 12,744,012 B2
(45) Date of Patent: Sep. 22, 2026

(54) LOCAL DIMMING PROCESSING ALGORITHM AND CORRECTION SYSTEM

(71) Applicant: Continental Automotive Systems, Inc., Auburn Hills, MI (US)

(72) Inventors: Daniel Cashen, Troy, MI (US); Sebastian Wolfarth, Babenhausen (DE); Ulrich Kabatek, Babenhausen (DE); Thomas Knieps, Hanau (DE); Rodrigo Ramos Cruz, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 29 days.

(21) Appl. No.: 18/275,566

(22) PCT Filed: Feb. 3, 2022

(86) PCT No.: PCT/US2022/015064
§ 371 (c)(1),
(2) Date: Aug. 2, 2023

(87) PCT Pub. No.: WO2022/169941
PCT Pub. Date: Aug. 11, 2022

(65) Prior Publication Data

US 2024/0119911 A1 Apr. 11, 2024

Related U.S. Application Data

(60) Provisional application No. 63/199,928, filed on Feb. 3, 2021.

(51) Int. Cl.
*G09G 3/34* (2006.01)
*G06T 3/40* (2006.01)

(52) U.S. Cl.
CPC ............. *G09G 3/3426* (2013.01); *G06T 3/40* (2013.01); *G09G 2320/0686* (2013.01); *G09G 2340/06* (2013.01); *G09G 2380/10* (2013.01)

(58) Field of Classification Search
CPC ......... G09G 3/3426; G09G 2320/0686; G09G 2340/06; G09G 2380/10; G09G 2330/021;
(Continued)

(56) References Cited

U.S. PATENT DOCUMENTS

2009/0184917 A1 7/2009 Park et al.
2009/0267926 A1 10/2009 Seo et al.
(Continued)

FOREIGN PATENT DOCUMENTS

CN 102947877 2/2013
CN 105590597 5/2016
(Continued)

OTHER PUBLICATIONS

Seul-Ki Kim, Seok-Jeong Song, and Hyoungsik Nam "Bilinear weighting and threshold scheme for low-power two-dimensional local dimming liquid crystal displays without block artifacts," Optical Engineering 53(6), 063110 (Jun. 27, 2014). https://doi.org/10.1117/1.OE.53.6.063110 (Year: 2014).*
(Continued)

*Primary Examiner* — Daniel F Hajnik
*Assistant Examiner* — Chris Alejandro Puntier
(74) *Attorney, Agent, or Firm* — COZEN O'CONNOR

(57) ABSTRACT

A method of providing full array local dimming to a display comprises performing an image processing algorithm with a processor having instructions for: determining a new pixel value for each of a plurality of pixels of the image, mapping the new pixel value to a prior pixel value for each of the plurality of pixels, scaling the image of the zone bilinearly,
(Continued)

repeating the determining mapping and scaling until an approximation value is reached, compiling the repeated results into a data set. The method also includes dividing an image for the display having into a plurality of zones each having at least one LED associate therewith and making an illumination decision from the data set, where the illumination decision is for the at least one LED associated with one of the plurality of zones.

19 Claims, 4 Drawing Sheets

(58) Field of Classification Search
CPC ... G09G 2340/02; G09G 2360/16; G06T 3/40
See application file for complete search history.

(56) References Cited

U.S. PATENT DOCUMENTS

| | | | | |
|---|---|---|---|---|
| 2009/0322800 | A1 | 12/2009 | Atkins | |
| 2011/0128302 | A1 | 6/2011 | Cho et al. | |
| 2011/0234654 | A1 * | 9/2011 | Park | H04N 21/47 345/204 |
| 2011/0316829 | A1 | 12/2011 | Oka et al. | |
| 2012/0057084 | A1 | 3/2012 | Sano et al. | |
| 2013/0016141 | A1 | 1/2013 | Chang et al. | |
| 2013/0120234 | A1 * | 5/2013 | Atkins | G09G 3/006 345/102 |
| 2018/0247609 | A1 | 8/2018 | Joshi et al. | |
| 2019/0355296 | A1 * | 11/2019 | Ji | G02F 1/133603 |
| 2020/0320940 | A1 | 10/2020 | Lee et al. | |

FOREIGN PATENT DOCUMENTS

| | | | | |
|---|---|---|---|---|
| CN | 110136657 | | | 8/2019 |
| CN | 112204647 | | | 1/2021 |
| JP | 2012008388 | A | | 1/2012 |
| JP | 20128388 | | | 5/2012 |
| JP | 2012097561 | | | 5/2012 |
| JP | 2014109619 | A | | 6/2014 |
| JP | 2018180333 | A | | 11/2018 |
| JP | 2020134949 | A | | 8/2020 |
| JP | 2020187306 | A | * | 11/2020 |
| KR | 1020110057506 | | | 1/2011 |
| KR | 20110057506 | A | | 6/2011 |
| KR | 1020200103566 | A | | 9/2020 |
| WO | 2017022513 | A1 | | 2/2017 |

OTHER PUBLICATIONS

Battiato, Sebastiano & Messina, Giuseppe & Castorina, Alfio. (2008). Chapter 1 Exposure Correction for Imaging Devices: an Overview. 10.1201/9781420054538.ch12. (Year: 2008).*

Office Action dated Jun. 21, 2024 from corresponding Korean patent application No. 10-2023-7029448.

Office Action dispatched May 28, 2024 from corresponding Japanese patent application No. 2023-547077.

International Search Report and Written Opinion dated May 9, 2022 from corresponding International patent application No. PCT/US2022/015064.

Notification of Reasons for Refusal dispatched Nov. 12, 2024 from corresponding Japanese patent application No. 2023-547077.

Chinese Office Action dated Nov. 12, 2025 based on CN Application No. 20220013299.7 filed Feb. 3, 2022.

Chinese Second Office Action dated Mar. 17, 2026 based on CN Application No. 20220013299.7 filed Feb. 3, 2022.

* cited by examiner

LOCAL DIMMING PROCESSING ALGORITHM AND CORRECTION SYSTEM

CROSS REFERENCE TO RELATED APPLICATIONS

This U.S. patent application claims the benefit of PCT patent application No. PCT/US2022/015064, filed Feb. 3, 2022, which claims the benefit of U.S. provisional application 63/199,928 filed Feb. 3, 2021, both of which are hereby incorporated by reference.

TECHNICAL FIELD

The technical field relates generally to displays and more particularly to a display for a vehicle.

BACKGROUND

Automobile vehicles typically use displays to share information with the vehicle occupants. In particular, displays show information that is used to the vehicle driver. However, the displays must function in a wide variety of ambient lighting varying from sunny daylight to dark night. To adjust for the various ambient lighting, brightness of the backlight for the display is varied.

Organic light-emitting diode (OLED) displays are very visually appealing but very expensive especially in the automotive market.

Another option is to provide a display with full-array local dimming (FALD) which consists of a plurality of arrays of light-emitting diodes (LEDs) over the entire back of the screen. These arrays will dim the part of the screen that needs to be darker without affecting the areas of the screen that need to be bright. Local dimming using thin film transistor (TFT) display with zonal direct backlighting as provided by a FALD display is a cheaper method to achieve similar performance.

To enable Full Array Local Dimming (FALD) the image must be tiled by indexing into zones. Each zone is quite large even for a relatively low-resolution display. In a highly capable compute environment, the method for determining the status of each zone as on or off is simply to read every pixel in the entire image and determine if it contains content. This causes a significant load on the processor and memory.

An example of processing power required to provide FALD using traditional computation methods even for a low pixel display would require high computational capacity. Such a method for determining the status of each zone as on or off is simply to read every pixel in the entire image and determine if it contains content. This causes a significant load on the processor and memory. Consider the example; 720 px×1920 px×60 fps×32 bit=248 MB/sec. This is far too much data to process in real time on a low cost embedded system on a chip (SoC) along with other functions. A common option is to develop and deploy a custom application specific integrated circuit (ASIC) to perform this calculation separately, but such an ASIC adds significant cost to the product.

Thus, this approach requires specialized processors that add cost and integration challenges reducing the benefit over OLED Therefore, and arrangement and method that provides a creative low-cost way to enable local dimming with no added hardware cost is desirable. More importantly, a FALD display that reduces error caused by approximating zone pixel status is desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One embodiment of a method of providing full array local dimming to a display comprises performing an image processing algorithm with a processors having instructions for: determining a new pixel value for each of a plurality of pixels of the image, mapping the new pixel value to a prior pixel value for each of the plurality of pixels, scaling the image of the zone bilinearly, repeating the determining mapping and scaling until an approximation value is reached, compiling the repeated results into a data set.

The method also includes dividing an image for the display having into a plurality of zones each having at least one LED associate therewith.

The method also includes making an illumination decision from the data set with the processor, where the illumination decision is for the at least one LED associated with one of the plurality of zones.

Other embodiments of this aspect include corresponding computer systems, apparatus, and computer programs recorded on one or more computer storage devices, each configured to perform the actions of the methods.

Implementations may include one or more of the following features. The method may include making an illumination decision for each of the plurality of zones.

The dividing the image into the plurality of zones further may include dividing the image such that each of the plurality of zones has one led associated therewith.

The method may include using the luminesence data of the pixels in the one of the plurality of zones to make an illumination decision.

The method may include determining the illumination decision is yes when there is at least one pixel within the one of the plurality of zones that has a luminance.

The method may include illuminating the at least one led associated with the one of the plurality of zones when the illumination decision is yes.

The method may include converting the compiled data set to a YUV image format.

Dividing the image into a plurality of zones and making the illumination decision further may include using a first processor and performing the image analysis algorithm uses a second processor.

The method may include sending the data set from the second processor to the first processor prior to the illumination decision.

The method may include sending the data set from the second processor to the first processor prior to dividing the image into a plurality of zones.

The second processor may be one of a plurality of system on a chips.

The second processors may be connected to at least one memory and where the memory includes a look up table of expansion curve values.

The determining, mapping, and scaling may be repeated for three iterations.

Dividing the image into a plurality of zones and making the illumination decision may be with a first processor and performing the image analysis algorithm may be with a second processor.

Implementations of the described techniques may include hardware, a method or process, or computer software on a computer-accessible medium.

Another embodiment of a method of providing full array local dimming to a display comprises dividing an image for the display having a plurality of pixels into a plurality of zones each having at least one LED associate therewith.

The method also includes performing an image processing algorithm with a processors having instructions for: determining a new pixel value for each of the plurality of pixels, mapping the new pixel value to a prior pixel value for each of the plurality of pixels, scaling the image of the zone bilinearly, repeating the determining mapping and scaling until an approximation value is reached, compiling the repeated results into a data set.

The method also includes making an illumination decision from the data set with the processor, where the illumination decision is for the at least one LED associated with one of the plurality of zones.

Other embodiments of this aspect include corresponding computer systems, apparatus, and computer programs recorded on one or more computer storage devices, each configured to perform the actions of the methods.

Implementations may include one or more of the following features.

The method may include making an illumination decision for each of the plurality of zones.

The dividing the image into the plurality of zones further may include dividing the image such that each of the plurality of zones has one led associated therewith.

The method may include using the luminesence data of the pixels in the one of the plurality of zones to make an illumination decision and determining the illumination decision is yes when there is at least one pixel within the one of the plurality of zones that has a luminance.

The method may include illuminating the at least one LED associated with the one of the plurality of zones when the illumination decision is yes.

The method may include converting the compiled data set to a YUV image format. Implementations of the described techniques may include hardware, a method or process, or computer software on a computer-accessible medium.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
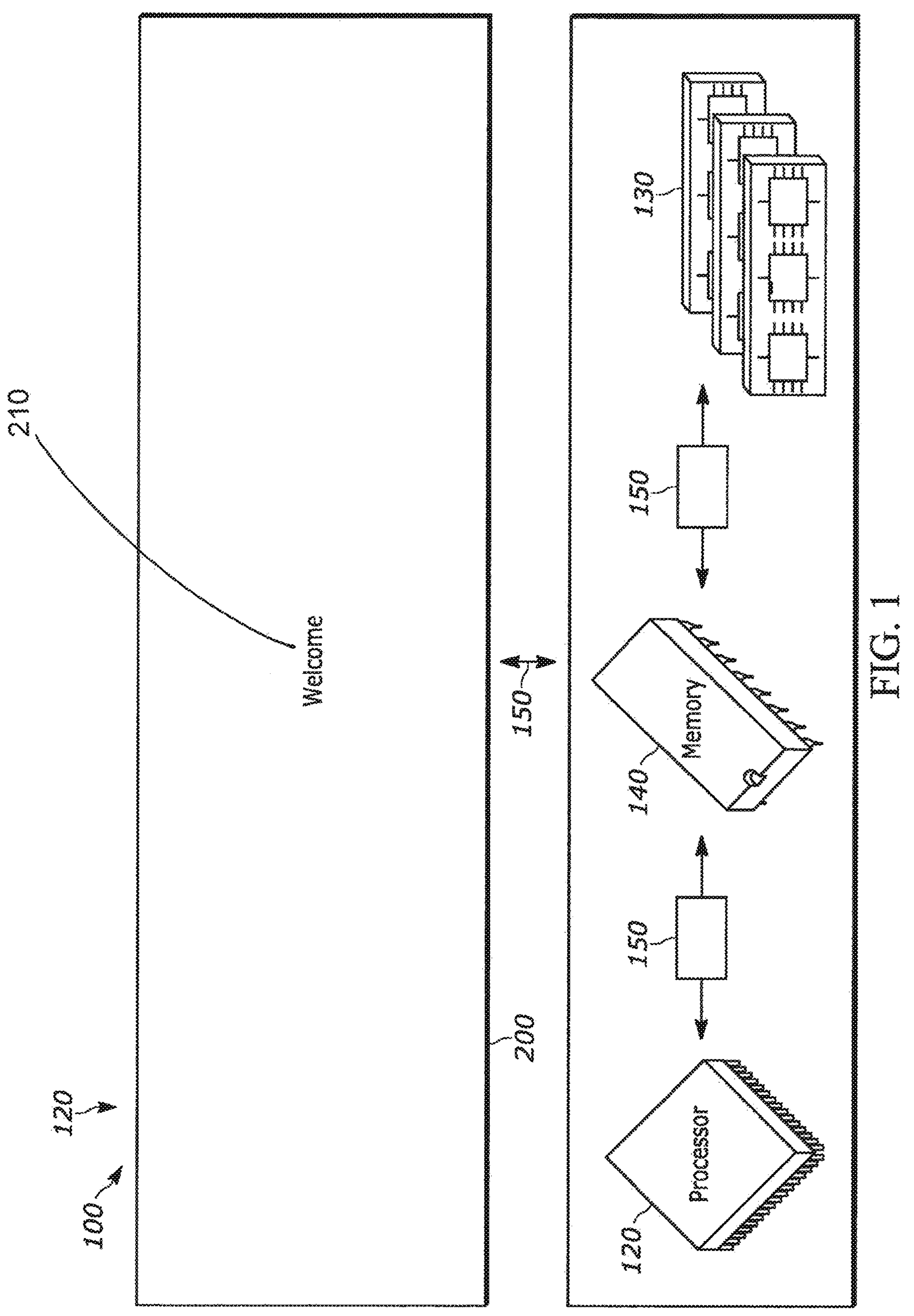
FIG. 1 is an example of a display having FALD according to one exemplary embodiment.

Referring to the Figures, wherein like numerals indicate like parts throughout the several views, a display system 100 for a vehicle 10 and a method for providing full-array local dimming (FALD) are shown and described herein. The embodiments may provide dimming including reducing a scale of light intensity provided by the array, including completely turning off an area or only partially reducing a light intensity on an area of a display 200.

Referring to FIGS. 1-5, the display system 100 is shown. The display system 100 is includes a display 200, a first processor 120, second plurality of processors 130, and at least one memory device, 140. The display 200, first processor 120, at least one second processor 130 and memory device have communication therebetween, illustrated at 150.

The display 200 illustrates an image 210. A plurality of LEDs 112 may provide backlight to the display 200. The image 210 may be divided into a plurality of zones 220, which are each comprised of a number of pixels 230. The number of pixels 230 for a given image 210 and display 200 may vary depending on the overall size of the display, the number of LEDs for the display, or by other desired factors. Each zone has at least one LED 112 associated therewith.

In one embodiment there is one LED 112 associated with each zone 220.

For each of the plurality of zones 220 the display system 100 must make a determination if that zone should or should not be backlit by the associated at least one LED based on the status of the pixels within that zone 220 of the display 200.

In order to provide FALD to the image 210 an evaluation algorithm 310 is applied to each of the plurality of zones 220 to determine if the at least one associated LED 112 should be turned ON or OFF. In order to reduce the computational power needed to evaluate the image 210 with the evaluation algorithm 310 an image processing algorithm 300 is applied prior to the LED evaluation.

In one embodiment the image processing algorithm 300 is applied prior to dividing the image 210 into the plurality of zones 220. Alternatively, the image processing algorithm 300 may be applied after the image is divided into the plurality of zones 220. In this embodiment the image processing algorithm as described herein is iteratively applied for each of the plurality of zones 220. Regardless of the order, both the image processing algorithm 300 and the division of the image into the plurality of zones 22 both occur before the LED evaluation algorithm 310.

The image processing algorithm 300 may be performed by the first processor 120 and the evaluation algorithm may be performed by the second processor 130. Alternatively, both the image processing algorithm and the evaluation algorithm may be performed by the second processor 130.

Further, either the first or the second processors 120, 130 may be a system on a chip. There may also be a plurality of first and second processors 120, 130. Thus, processing can be performed with industry standard hardware acceleration supported in many embedded system on a chip (SoC)s at no additional cost.

The image processors 120, 130 implement the image processor algorithm 300 by using a look up table (LUT) having an expansion curve. An old pixel value may include a color associated with each pixel. The new pixel value may be in back and white. Thus, any pixel having a color is converted to a white/ON format and others are converted to a black/OFF format.

The new pixel values are mapped to the old pixel values.

The image 210 is then scaled bilinearly with a scale factor no larger than 2. By scaling the image this preserves the original pixel data. Therefore, in one embodiment the second plurality of processors may 130 be SoCs.

In one embodiment the scale factor is two.

While scaling the data reduces the required processing capability, as the number of scaling iterations increases error measured in reduction in percent zones on also increases. Therefore, the look up table applies an expansion curve to correct the error.

Figure 3:
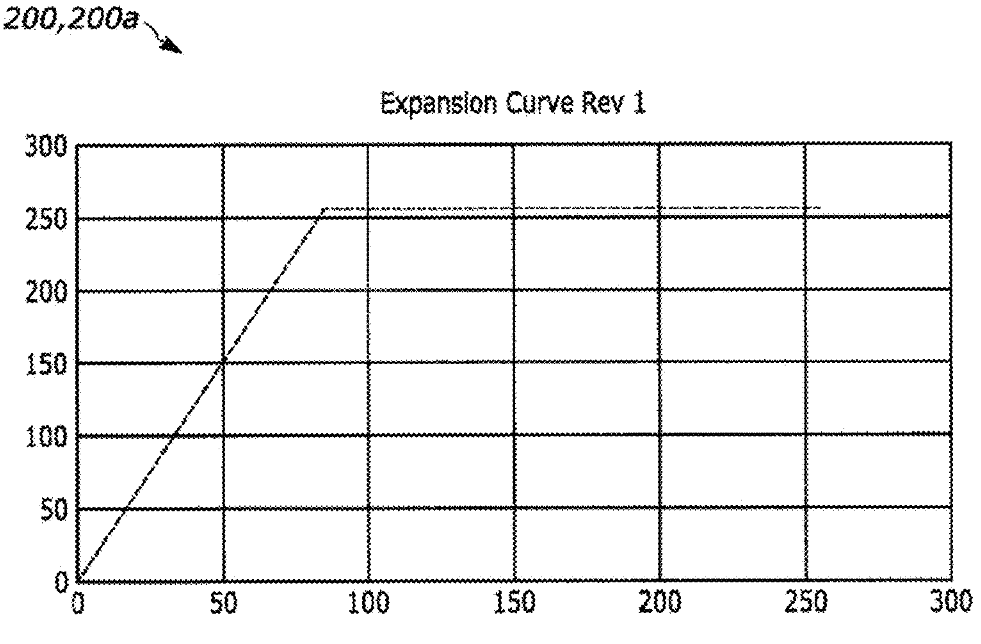
FIG. 3 is a graphic illustration of pixel on percentage compared to scaling iterations according to one exemplary embodiment.

The lookup table may be loaded from at least one memory device 140 into the processors 130 and stored there during execution of the approximation process. Therefore, iterative application of using a look up table that applies an expansion curve can be used, as shown FIGS. 3 and 4. The expansion curve, as shown in FIG. 3 corrects for the error caused by the down scaling.

Figure 4:
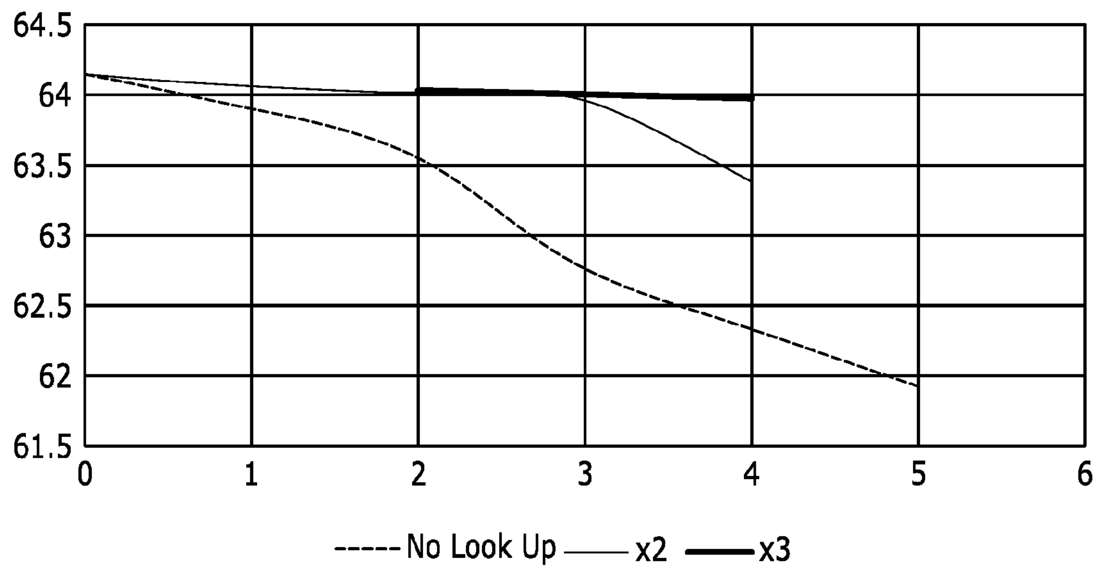
FIG. 4 is a graphic illustration of an expansion curve application for pixel scaling according to one exemplary embodiment

Consider FIG. 4 with ×2 and ×3 iterations of the look up table with expansion curves applied. The error caused by downscaling is reduced to near 0 even for high iteration scaling. As shown in FIG. 4 the percentage of LEDs evaluated to be turned ON is compared to the number of scaling iterations which occur. After ×3 scaling iterations the percentage ON LEDs becomes a substantially linear number. Thus, further scaling iterations may be unnecessary. Thus, the impact of scaling as a computation reduction technique becomes visible to the user.

Figure 2:
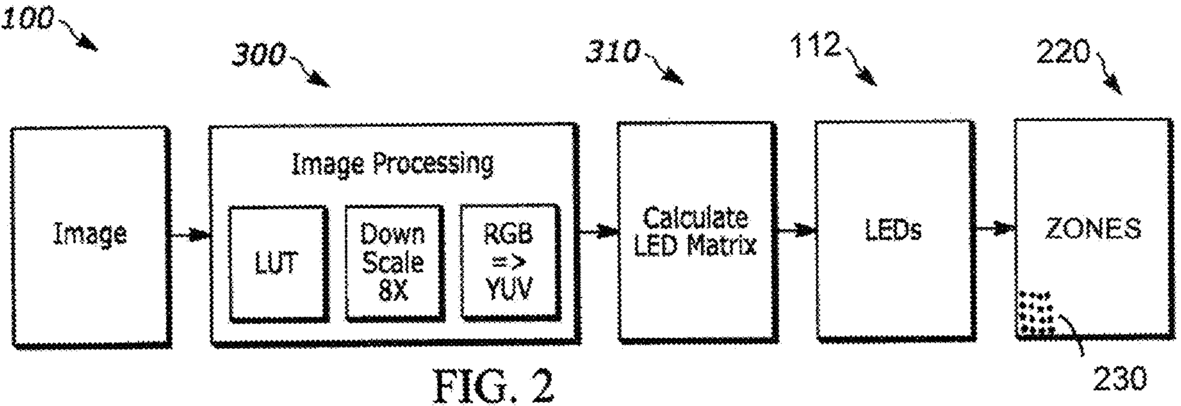
FIG. 2 is a block diagram showing an apparatus for implementing FALD according to one exemplary embodiment.

Once the approximation process is complete, here with an 8 times downscale approximation value the information is compiled into a data set. The end results of the iterative scaling and expansion curve process is highly compressed data. As illustrated in FIG. 2, in one example the down scale is an 8× downscale. That is a 2 scale downscale factor that has been iteratively performed three times ($2^3$) to achieve the 8× downscale factor. In this example the compression is −256 times due to this process alone. This enables smart FALD implementation without the need for additional processing hardware.

For example, for a zone of approximately 80×80 pixels (for example) can be compressed to 5×5 or similar computationally. The CPU or first processor is then able to easily read the smaller information and make illumination decisions 310 based on this information.

Further, a pixel color format with lower bandwidth consumption (lower number of bytes per pixel) could be utilized for the processing and the final analysis of the compressed data by CPU. The original image material for analysis is typically presented as RGB pixel data with 4 bytes per pixel for direct display feeding. The embedded filter engines (stated above) often support multiple color formats and “on the fly” color format conversion. After the first iteration, the data could be stored/read in a format with less bytes per pixel—for example YUV NV12 with 2 bytes per pixel. This will reduce the system bandwidth consumption significantly during analysis. YUV color formatting includes the luminosity data (Y) and chroma data (UV). However, as explained in further detail below only the luminosity data is used for the evaluation algorithm 310. Therefore, only 1 byte per pixel data is used. The scaled and converted data set is only used by the evaluation algorithm 310, therefore the loss of color and chroma data is not needed for further processing and can be discarded from the converted data set to save memory and processing.

FIG. 2 illustrates reformatting the image 210 from RGB color formatting to YUV color formatting during the process which may be optionally included to simplify the software analysis. The prior look up table has converted the pixels already into black and white value equivalent to luminosity data of ON and OFF. Further, simplifying matters, the chroma information (UV) may not be necessary for the evaluation algorithm. Therefore, the potential loss on chroma (UV) information details might not impact the analysis at all and the important luminance (Y) information loss is minor at such format. The final analysis result can be stored in a planar or semi-planar YUV format.

Finally, the evaluation algorithm 310, looks at the luminosity value (Y) for each of the plurality of zones. If there is a luminosity value present ON (white) the evaluation algorithm 310 will determine that the at least one LED 120 for that zone 220 should be ON. However, if there is no luminosity value present, i.e. OFF (black), the evaluation algorithm will determine that the at least one LED for that zone should be OFF. Therefore, the CPU may just read and process the important luminance (Y) information and does not need to read and may discard the unimportant chroma (UV) information.

The image may be divided to have a certain number of LEDs per zone e.g. one or more, or to provide zones such that each zone is centered around one LED. If there is one LED per zone the illumination decision for that zone may be based on the luminance value of all the pixels within that zone. In other words, if any of the pixels within a zone have a luminance value the luminance evaluation is YES/ON. However, if none of the pixels within a zone have a luminance value than the luminance evaluation equals NO/OFF. In this instance the LED which illuminates a particular pixel may be not be directly behind the pixel itself but may be sufficiently proximate to provide a sufficient amount of back light to illumination the YES/ON pixel. For example, for zone of 3×3 pixels the LED may be located directly behind the center pixel. However, the illumination decision is YES/ON if any of the nine pixels have an associated luminance. For the other eight pixels in that zone the LED which illuminates that pixel is not directly behind the pixel but is in sufficient proximity to the centrally located LED to have sufficient luminance.

The level of sufficient luminance and the proximity which an LED can be from a particular pixel to provide that sufficient illumination may be determine by one skilled in the art for the particular display system 100.

Alternately, the plurality of zones may be determined by dividing the number of pixels to create zones of even pixel sized, e.g. each zone is 10×10 pixels, for the entire image. If there are multiple LEDs in a zone the LED luminance decision may be the same for all the LED. For example, if there is more than one LED in a zone than all the LEDs are illuminated or none of the LEDs are illuminated for that zone. The illumination decision may be to illuminate all the LEDs if there is at least one pixel with a luminance value. This embodiment may cause some LEDs to be lit unnecessarily. However, the overall processing power to make the lumination decision would be less than making a decision for each LED individually.

In one embodiment, there may be one luminance value per zone regardless of the number of pixels that are associate with a particular zone. If any of the pixels have a luminance that zone would have a luminance value of ON. This is the information that may be saved as part of the data set and converted into YUV format. Thus, the location of the specific pixel(s) within a zone that have a luminance value and require illumination may not be known.

The amount of illumination provided by each LED 112 will decrease as the distance from the LED 112 increases. Therefore, pixels directly over the center of the LED 112 will have greater illumination than pixels that are further from the LED 112. Depending on the division of the plurality of zones 220 some pixels, for example, those on or near the perimeter of a zone 220 may be less illuminated by an LED 112 than a pixel close to the center of the zone.

If the pixel(s) which have a luminance value and therefore need to be illuminated by the LED 112 are located on or near the proximity of the zone the amount of illumination provided by the associate LED(s) 112 may be lower or even less than desired. Therefore, it may be desirable to illuminate the LED(s) 112 in an adjacent zone 220 as well as the zone 220 as well. As such, a further step in the luminance decision for each zone 220 may be to evaluate the luminance value of each of the adjacent zones 220 as well.

One skilled in the art would be able to decide how may zones 220, the size of the zones, and the number of LEDs 112 per zone for a particular display system 100 including based on the overall display 100 size, the display definition, the number of LEDs, the available processing capacity 120, 130, and the desired luminance value for that display system 100

Figure 5:
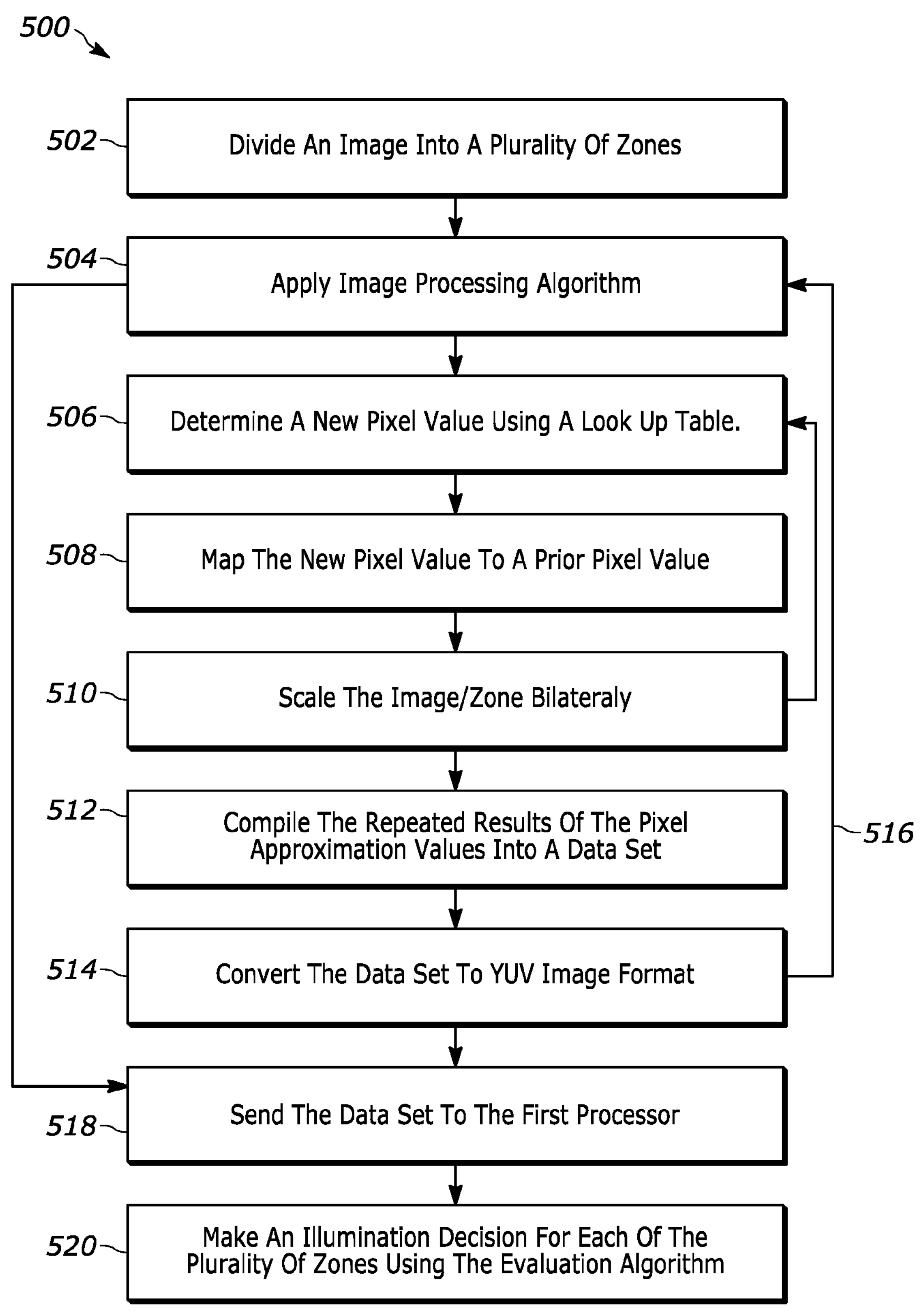
FIG. 5 is an illustration of a first embodiment of a method of providing an image having full array local dimming.

A method 500 according to one embodiment is shown in FIG. 5. The method of providing full array local dimming to a display comprises dividing an image into a plurality of zones, 502 with a first processor; applying an image processing algorithm using a second processor, 504 including: determining a new pixel value using a look up table (LUT), 506; mapping the new pixel value to an old pixel value, 508; scaling the image bilinarly, 510. The determining, mapping and scaling are repeated 514 until an approximation value is reached. The results are compiled into a data set, 512. The data set is converted into a YUV image format and saved to the memory.

As previously mentioned the method may be performed on one processors and the step of sending the data set from one processor to another may be eliminated.

Further, the data set may be compiled and converted to the YUV format to be saved after any number of iterations of determining the new pixel value, mapping the values and scaling the image, including after just one iteration.

Further, the total number of iterations performed and the approximation value to be reached may be determined to balance the reductions of data and associated processing with the amount of error introduced by the scaling process. One skilled in the art would be able to determined the desired number of iterations and approximation values for a particular display system 100 including the number, size and speed of the display, processors, memory, etc.

The data set 512 is sent from the second processor 130 to the first processor 110, step 518. The method also includes performing an evaluation algorithm to make an illumination decision for each of the plurality of zones from the data set with the first processor, 520.

Therefore, the evaluation algorithm may also include making an illumination decision for each of the plurality of zones.

Further, making an illumination decision based on the illumination value of that zone of each of the zones adjacent to that zone as well.

Finally, due to the decreased computational power required for the evaluation algorithm the method may be performed at frequency that is matched to the display system 100 as well. For example, a display system 100 may have a refresh rate of 60 Hz. The refresh rate of the display system 100 may be selected for a number of parameters which may include but is not limited to the processing of the full array dimming method described herein.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of providing full array local dimming to a display comprising:

performing an image processing algorithm with at least one processor having instructions for:

determining a new pixel value for each pixel of a plurality of pixels of the image;

mapping the new pixel value to a prior pixel value for each pixel of the plurality of pixels;

scaling the image of the zone bilinearly;

repeating the determining, mapping and scaling until an approximation value is reached; and compiling the repeated results into a data set;

dividing an image for the display into a plurality of zones which each have at least one LED associate therewith; and making an illumination decision from the data set via the processor based on an evaluation algorithm in which only luminosity data is utilized and color and chroma data are discarded from the data set to reduce memory and processing requirements;

wherein the illumination decision is for the at least one LED associated with one zone of the plurality of zones; and wherein repeating the determining, mapping, and scaling comprises progressively reducing a spatial resolution of the image to generate a reduced resolution luminance only representation utilized for zone level LED illumination decisions.

2. The method of claim 1, further comprising:

making the illumination decision for each of the plurality of zones.

3. The method of claim 2, wherein the dividing the image into the plurality of zones further comprises dividing the image such that each zone of the plurality of zones has one LED associated therewith.

4. The method of claim 1, further comprising:

utilizing only the luminesence data of the pixels in the one of the plurality of zones to make the illumination decision.

5. The method of claim 4, further comprising:

determining the illumination decision is YES when at least one pixel within the one of the plurality of zones having a luminance is present.

6. The method of claim 5, further comprising:
illuminating the at least one LED associated with the one zone of the plurality of zones when the illumination decision is YES.

7. The method of claim 1, further comprising:
converting the compiled data set into a YUV image format.

8. The method of claim 1, wherein dividing the image into a plurality of zones and making the illumination decision further comprises utilizing a first processor and performing an image analysis algorithm via a second processor.

9. The method of claim 8, further comprising:
sending the data set from the second processor to the first processor prior to the illumination decision.

10. The method of claim 8, further comprising:
sending the data set from the second processor to the first processor prior to dividing the image into the plurality of zones.

11. The method of claim 8, wherein the second processor is one of a plurality of systems on a chip.

12. The method of claim 1, wherein the second processor is connected to at least one memory; and wherein the memory includes a look up table of expansion curve values.

13. The method of claim 1, wherein the determining, mapping, and scaling are repeated for three iterations.

14. A method of providing full array local dimming to a display comprising:
dividing an image for the display having a plurality of pixels into a plurality of zones which each have at least one LED associate therewith;
performing an image processing algorithm with at least one processor having instructions for:
determining a new pixel value for each of the plurality of pixels;
mapping the new pixel value to a prior pixel value for each of the plurality of pixels;
scaling the image of the zone bilinearly;
repeating the determining, mapping and scaling until an approximation value is reached; and
compiling the repeated results into a data set; and
making an illumination decision from the data set with the processor based on an evaluation algorithm in which only luminosity data is utilized and color and chroma data are discarded from the data set to reduce memory and processing requirements;
wherein the illumination decision is for the at least one LED associated with one zone of the plurality of zones; and
wherein repeating the determining, mapping, and scaling comprises progressively reducing a spatial resolution of the image to generate a reduced resolution luminance only representation utilized for zone level LED illumination decisions.

15. The method of claim 14, further comprising:
making the illumination decision for each zone of the plurality of zones.

16. The method of claim 15, wherein the dividing the image into the plurality of zones further comprises dividing the image such that each zone of the plurality of zones has one LED associated therewith.

17. The method of claim 14, further comprising:
utilizing only the luminesence data of the pixels in the one zone of the plurality of zones to make the illumination decision; and
determining the illumination decision is YES when at least one pixel within the one zone of the plurality of zones having a luminance is present.

18. The method of claim 17, further comprising:
illuminating the at least one LED associated with the one zone of the plurality of zones when the illumination decision is YES.

19. The method of claim 14, further comprising:
converting the compiled data set to a YUV image format.

* * * * *